United States Patent Office 3,355,517
Patented Nov. 28, 1967

3,355,517
PROCESS FOR PREPARING VINYL
CHLORIDE COPOLYMERS
Stefan Müllner and Walter Albert, Frankfurt am Main, Germany, assignors to Farbwerke Hoechst Aktiengesellschaft vormals Meister Lucius & Brüning, Frankfurt am Main, Germany, a corporation of Germany
No Drawing. Filed June 15, 1965, Ser. No. 464,219
Claims priority, application Germany, June 20, 1964,
F 43,226
8 Claims. (Cl. 260—878)

It is known that polyvinyl chloride of high impact strength can be prepared by polymerizing vinyl chloride in the presence of small proportions of elastomers.

Satisfactory results can only be obtained however, when polyvinyl chloride is modified with elasticizing components in a manner such that its brittleness is reduced without the resistance to ageing and the dimensional stability under heat being impaired. It has not been possible, hitherto, to solve this problem to a satisfactory extent.

Attempts have been made to produce impact resistant polyvinyl chloride by adding in the polymerization of vinyl chloride in the presence of rubber-elastic polymers having an unsaturated character a further monomer yielding soft homopolymers, for example an acrylic acid ester. Polymers produced in this manner have a better notched bar impact strength than pure polyvinyl chloride but simultaneously their dimensional stability under heat is diminished.

In general, vinyl chloride polymers, which have been modified with rubber-elastic unsaturated polymers, have the drawback that they tend to age due to the unsaturated character of the latter polymers, and that the good mechanical properties are lost, especially when exposed to weathering.

British specification No. 971,629 describes a process for preparing copolymers having an extremely heterogeneous structure which permits, for example, the preparation of copolymers of vinyl chloride with 2-ethylhexyl-acrylate having a good notched bar impact strength and simultaneously a satisfactory dimensional stability under heat according to Vicat. According to the aforesaid process the two components are polymerized in a manner such that the 2-ethylhexyl-acrylate and part of the vinyl chloride are first introduced into the polymerization vessel and polymerized for a certain period of time (pre-polymerization) and the residual portion of the vinyl chloride is then metered in. As compared with a conventional process (single-pot process) in which the total amount of the monomers is polymerized together, the copolymers of vinyl chloride with 2-ethylhexyl-acrylate prepared as described above had better properties, particularly a better notched bar impact strength and a high dimensional stability under heat.

However, it has been found that in many fields of application the values of the notched bar impact strength which can be obtained simultaneously with a high dimensional stability under heat of the vinyl chloride copolymers prepared by the aforesaid process are still unsatisfactory.

It has now been found that copolymers of vinyl chloride having a high notched bar impact strength and simultaneously a high dimensional stability under heat can be prepared by copolymerizing vinyl chloride with acrylic acid esters in aqueous emulsion or suspension in the presence of catalysts, emulsifiers and/or suspension stabilizers and in the presence of an elastomeric polymer and pre-polymerizing part of the vinyl chloride with the co-components and then adding the residual portion of the vinyl chloride after some time, when vinyl chloride is polymerized with 2 to 6% by weight, calculated on the total weight of the starting components, of an acrylic acid ester, the alkyl group of which contains 5 to 15 carbon atoms in the presence of 2 to 6% by weight, calculated on the total weight of the starting components, of an elastomeric, preponderantly amorphous copolymer of ethylene, propylene, and 1–10% by weight of a nonconjugated, aliphatic or alicyclic diolefin.

It is surprising that vinyl chloride copolymers which have been prepared in this manner have a considerably higher notched bar impact strength and simultaneously a higher thermal dimensional stability under heat even with small proportions of elastomer and acrylic acid ester in the copolymer than corresponding copolymers of vinyl chloride and acrylic acid ester alone or graft copolymers of vinyl chloride with the same elastomers.

The process according to the invention can be carried out in aqueous emulsion or suspension. Advantageously, the suspension process is used. Copolymers having the favorable combination of mechanical properties, i.e. a high notched bar impact strength and a high dimensional stability under heat, are obtained by pre-polymerizing the acrylic acid ester, and part of the vinyl chloride in presence of the elastomeric polymer at a given temperature for a certain period of time, preferably 30 minutes to 3 hours, and then adding the residual vinyl chloride, suitably after 30 minutes to 7 hours, advantageously in the third to sixth hour. At the beginning of polymerization the vessel is charged with the total amount of the elastomeric polymer, the acrylic ester component and part of the vinyl chloride, preferably one third thereof. The catalyst to be used can be introduced together with the above components or directly prior to the beginning of polymerization.

The catalyst is used in an amount of 0.1 to 0.5%, calculated on the total amount of vinyl monomers.

It is of advantage when the vinyl monomers, i.e. vinyl chloride and acrylic acid ester, are uniformly distributed in the elastomeric polymer. This can be achieved by reciprocal swelling or dissolution or by means of auxiliary solvents or swelling agents prior to the beginning of polymerization.

As elastomers are used elastic copolymers of ethylene, propylene and 1 to 10% by weight of a non-conjugated, aliphatic or alicyclic diolefin, for example hexadiene (1,4) or heptadiene-(1,5) and preferably dicyclopentadiene having a small number of unsaturated linkages corresponding to 1.5 to 15 double bonds for 1000 carbon atoms. The elastomers are used in an amount of 2 to 6 and preferably 2.5 to 4.5% by weight, calculated on the total weight of the starting components. The acrylic acid ester is likewise used in an amount of 2 to 6 and preferably 2.5 to 4.5% by weight, calculated on the total weight of the starting components.

As acrylic acid esters there are used those the alcohol radical of which contains 5 to 15 and preferably 6 to 12 carbon atoms. Especially suitable are esters of acrylic acid with strongly branched alcohols and those which, in the form of homopolymers, have a second order transition temperature below 0° C., advantageously of about −70° C., for example acrylic acid esters of alcohols from the "oxo" synthesis. It is likewise possible to use acrylic acid esters with functional groups in the alcohol component provided that the second order transition temperature of the homopolymer is at about −70° C. As regards the definition of the second order transition temperature of homopolymers of acrylic acid esters reference is made to Ind. Eng. Chem. 40, (1948), page 1431, right-hand column.

As catalysts there are used the known monomer- and water-soluble free-radical liberating agents such as dilauroyl peroxide or potassium peroxy-disulfate.

Suitable dispersing agents are surface-active substances such as the known water-soluble emulsifiers, protective colloids or combinations thereof.

In general, the polymerization is carried out at a temperature in the range of from 40 to 70° C.

The process according to the invention yields fine-grained polymers which can be rolled, molded, blown and extruded without the addition of external plasticizers with the usual stabilizers whereby articles are obtained which have a high notched bar impact strength and are resistant to light, air, and water and largely resistant to solvents. Owing to the good compatibility of the co-components the shaped articles are more transparent than articles made from polyvinyl chloride which has been modified with elastomers alone.

It is likewise possible to process the vinyl chloride co-polymers according to the invention with external, monomeric or polymeric plasticizers.

The following examples serve to illustrate the invention but they are not intended to limit it thereto, the parts being by weight unless otherwise stated.

EXAMPLE 1 (Comparative example)

*Graft polymerization of vinyl chloride with elastomeric ethylene-propylene copolymer*

A stainless steel vessel having a capacity of 40 liters and provided with anchor stirrer was charged with 17.9 parts of de-ionized water, 6.75 parts of hydroxyethyl-cellulose solution of 2% strength by weight, 0.003 part of sodium diisobutyl-naphthalene-sulfonate, 0.485 part of an elastomeric ethylene-propylene copolymer having a propylene proportion of 30% by weight and a reduced specific viscosity of 2, and with the exclusion of oxygen, 7.5 parts of vinyl chloride were forced in. The polymerization mixture was stirred for 4 hours at 70° C. and then cooled to 20° C. 0.5 part of vinyl chloride and 0.028 part of dilauroyl peroxide were introduced and the mixture was stirred for one hour. Polymerization was then initiated by heating the content of the vessel at 50° C. When the pressure in the vessel had dropped to 2.5 atmospheres gauge, the polymerization mixture was cooled, degassed and the fine-grained product was discharged, washed and dried. The product contained 7% by weight of elastomer, determined by chlorine analysis. It could be processed without addition of a plasticizer.

The product was found to have the following properties, determined with standard test bars, in comparison to hard polyvinyl chloride:

|   | Hard PVC |
|---|---|
| Notched bar impact strength at 0° C., 4 cm. kg./cm.$^2$ | 2.5 cm. kg./cm.$^2$ |
| Notched bar impact strength at 20° C., 5 cm. kg./cm.$^2$ | 3.5 cm. kg./cm.$^2$ |
| Dimensional stability under heat (82° C.) according to Vicat | 85° C. |

EXAMPLE 2 (Comparative example)

*Copolymerization of vinyl chloride with 2-ethylhexyl acrylate according to the single pot process*

A stainless steel vessel having a capacity of 5 liters and provided with anchor stirrer was charged with 3 parts of de-ionized water, 0.25 part of hydroxyethyl-cellulose solution of 2% strength by weight (cellulose hydroxypropylmethyl ether solution having a viscosity of 15 centipoises at 20° C. and a gelling point of 65° C., trademark "Methocell" HG 65), 0.001 part of sodium diisobutylnaphthalene sulfonate and 0.0016 part of dilauroyl peroxide and, with the exclusion of air, a mixture of 1.400 parts of vinyl chloride and 0.100 part of 2-ethylhexyl-acrylate was forced in. The mixture was stirred for 30 minutes at 20° C. whereupon polymerization was initiated by heating the reaction mixture to 50° C. When the pressure in the vessel had dropped to 2.5 atmospheres gauge, the mixture was cooled, degassed, the fine-grained product was discharged, washed and dried. The product could be processed without the addition of a plasticizer. It contained 7% by weight of 2-ethylhexyl-acrylate, determined by chlorine analysis.

Notched bar impact strength at 0° C. ___ 3 cm. kg./cm.$^2$.
Notched bar impact strength at 20° C. __ 5 cm. kg./cm.$^2$.
Dimensional stability under heat according to Vicat _____ 72° C.

EXAMPLE 3 (Comparative example)

*Process described in British Patent 971,629*

An enamelled vessel having a capacity of 150 liters, provided with heating jacket, impeller and current deviation means with two arms and directed downward, was charged with 99 parts of de-ionized watr, 3.9 parts of hydroxyethyl-cellulose solution of 2% strength by weight (as defined in Example 2), 0.104 part of gelatine, 0.1 part of oleyl alcohol, 3.64 parts of 2-ethylhexyl-acrylate and 0.06 part of dilauroyl peroxide, the vessel was closed, filled three times wtih nitrogen and evacuated each time. 7.28 parts of vinyl chloride were then added, the mixture was stirred for 30 minutes, the temperature was uniformly increased to 62° C. (internal temperature) and the mixture was polymerized for one hour. In the course of 3 hours 41.08 parts of vinyl chloride were uniformly pumped in. The internal temperature of the vessel was maintained at 62° C. until the pressure in the vessel had dropped to 4 atmospheres gauge. The vessel was cooled to 20° C., degassed, the fine-grained product was discharged, washed and dried. The product contained 6.9% by weight of acrylate, determined by chlorine analysis. It could be processed without plasticizer.

Notched bar impact strength at 0° C. __ 5 cm. kg./cm.$^2$.
Notched bar impact strength at 20° C. _ 12 cm. kg./cm.$^2$.
Dimensional stability under heat according to Vicat _____ 72° C.

EXAMPLE 4 (According to invention)

An enamelled vessel having a capacity of 150 liters, provided with heating jacket, impeller and current deviation means with two arms and directed downward, was charged with 96 parts of de-ionized water, 7 parts of hydroxyethylated cellulose solution of 2% strength by weight (as defined in Example 2), 0.1 part of oleyl alcohol, 1.82 parts of 2-ethylhexyl-acrylate, 1.82 parts of an ethylene/propylene/dicyclopentadiene copolymer having a reduced viscosity of 1.85, a propylene content of 40% by weight and a dicyclopentadiene content of 3% by weight, and 0.06 part of dilauroyl peroxide, the vessel was closed, filled three times with nitrogen and evacuated each time. 7.28 parts of vinyl chloride were then added and the mixture was stirred for 1 hour at 20° C. Over a period of 150 minutes the mixture was uniformly heated to an internal temperature of 62° C. and prepolymerized for one hour. 41.08 parts of vinyl chloride were then pumped in uniformly in the course of 3 hours. When the pressure in the vessel had dropped to 4 atmospheres gauge, the mixture was cooled, degassed, the fine-grained product was discharged, washed and dried. The product had a content of 7.6% by weight of elastomer and acrylate together, determined by chlorine analysis. It could be processed without the addition of a plasticizer.

Notched bar impact strength at 0° C. __ 9 cm. kg./cm.$^2$.
Notched bar impact strength at 20° C. _ 24 cm. kg./cm.$^2$.
Dimensional stability under heat according to Vicat _____ 82° C.

EXAMPLE 5 (According to invention)

Polymerization was carried out as described in Example 4 with the exception that 2.73 parts of the ethylene/propylene/dicyclopentadiene copolymer and 0.91 part of 2-ethylhexyl-acrylate were used. The product obtained had the following properties:

Notched bar impact strength at 0° C. __ 9 cm. kg./cm.$^2$.
Notched bar impact strength at 20° C. _ 33 cm. kg./cm.$^2$.
Dimensional stability under heat according to Vicat _____ 82° C.

In the following table are summarized the values of the notched bar impact strength and the dimensional stability under heat according to Vicat of the vinyl chloride copolymers obtained as described in comparative Examples 1, 2 and 3 and in Examples 4 and 5 according to the invention.

10% by weight of dicyclopentadiene, corresponding to a number of double bonds of 1.5 to 15 for 1000 carbon atoms.

3. The process of claim 1, wherein the elastomeric copolymer is an ethylene/propylene/diolefin copolymer containing 20 to 90% of propylene.

TABLE

| Copolymer according to Example | | Composition of copolymer | Notched bar impact strength, cm.kg./cm.² at — | | Dimensional stability under heat acc. to Vicat. |
|---|---|---|---|---|---|
| | | | 0° C. | 20° C. | |
| 1 | (Comparative Ex.) | Vinyl chloride/ethylene propylene copolymer (93:7). | 4 | 5 | 82 |
| 2 | do | Vinyl chloride/2-ethylhexyl-acrylate (93:7). | 3 | 5 | 72 |
| 3 | (Comparative Ex. British Patent No. 971,629). | Vinyl chloride/2-ethylhexyl-acrylate (93.1:6.9). | 5 | 12 | 72 |
| 4 | According to invention | Vinyl chloride/2-ethylhexyl-acrylate/ ethylene propylene-dicyclopentadiene copolymer ((93:3.5:3.5). | 9 | 24 | 82 |
| 5 | do | Vinyl chloride/2-ethylhexyl-acrylate/ ethylene propylene-dicyclopentadiene copolymer (93:1.7:5.3). | 9 | 33 | 82 |
| | | Hard-polyvinyl chloride | 2.5 | 3.5 | 85 |

We claim:
1. A process for preparing vinyl chloride polymers having a high notched bar impact strength and simultaneously a high dimensional stability under heat by copolymerizing vinyl chloride with acrylic acid esters in aqueous emulsion or suspension in the presence of catalysts, emulsifiers and suspension stabilizers and in the presence of an elastomeric polymer and prepolymerizing part of the vinyl chloride with the co-components, which comprises polymerizing vinyl chloride with 2 to 6% by weight, calculated on the total weight of the starting components, of an acrylic acid alkyl ester, the alkyl group of which ester contains 5 to 15 carbon atoms, and 2 to 6% by weight, calculated on the total weight of the starting components, of an elastomeric, preponderantly amorphous copolymer of ethylene, propylene and 1 to 10% by weight of a non-conjugated aliphatic or alicyclic diolefin.

2. The process of claim 1, wherein the elastomeric copolymer is a copolymer of ethylene, propylene and 1 to 10% by weight of dicyclopentadiene, corresponding to a number of double bonds of 1.5 to 15 for 1000 carbon atoms.

3. The process of claim 1, wherein the elastomeric copolymer is an ethylene/propylene/diolefin copolymer containing 20 to 90% of propylene.

4. The process of claim 1, wherein the elastomeric copolymer is an ethylene/propylene/diolefin copolymer containing 30 to 60% of propylene.

5. The process of claim 1, wherein 2-ethylhexyl-acrylate is used as acrylic acid alkyl ester.

6. Vinyl chloride copolymer prepared by the process of claim 1.

7. Vinyl chloride copolymer prepared by the process of claim 2.

8. Vinyl chloride copolymer prepared by the process of claim 5.

References Cited

UNITED STATES PATENTS 3,271,477    9/1966    Kresge _____ 260—877

SAMUEL H. BLECH, *Primary Examiner.*

D. J. BREZNER, *Assistant Examiner.*